Feb. 2, 1954  C. E. McCORMICK  2,667,912
ADJUSTABLE SEAT SUPPORTING MEANS
Filed Sept. 11, 1951  4 Sheets-Sheet 1
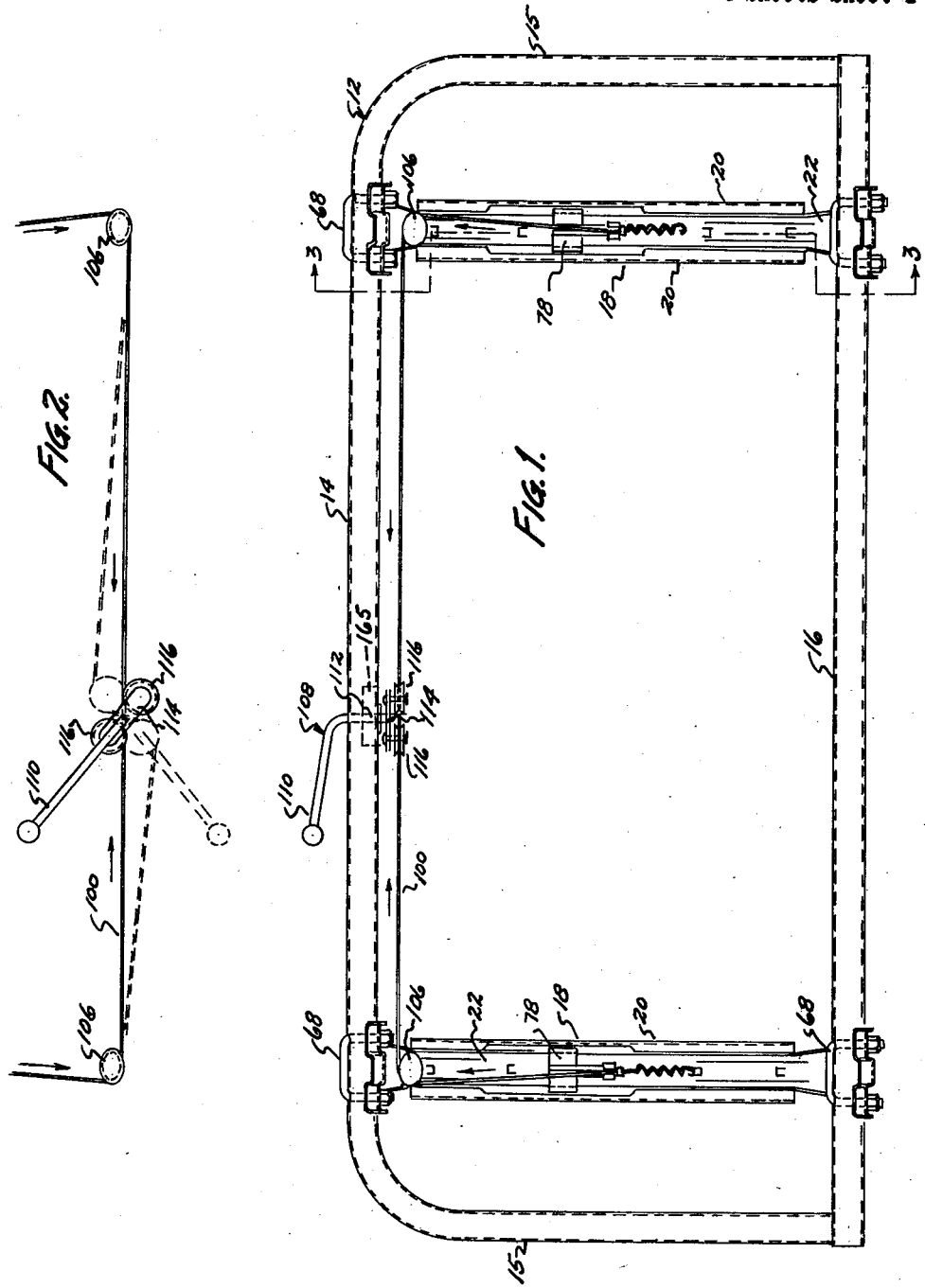
INVENTOR.
CHARLES E. McCORMICK
BY
Barnes, Kisselle, Laughlin & Raisch

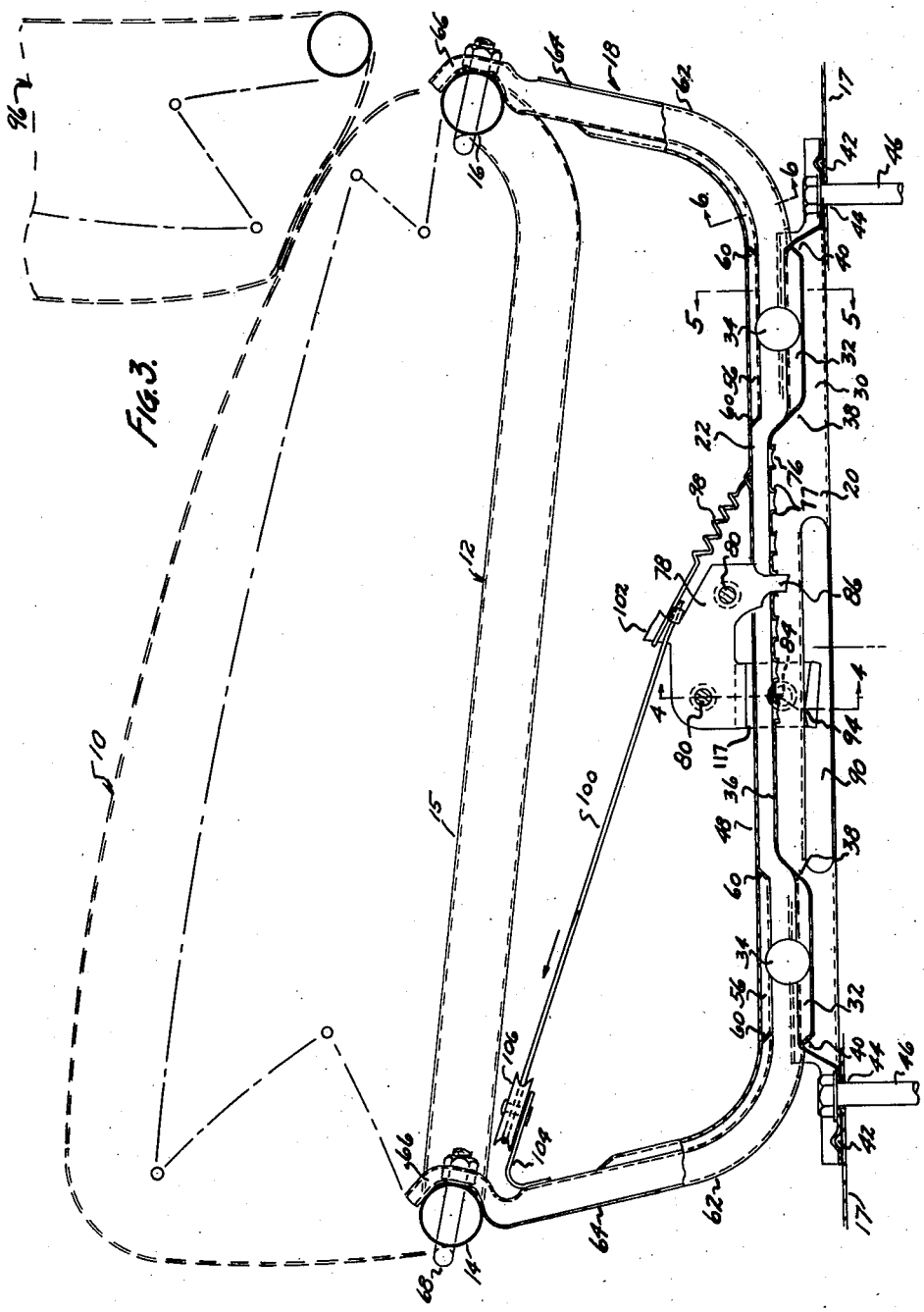

Feb. 2, 1954
C. E. McCORMICK
2,667,912
ADJUSTABLE SEAT SUPPORTING MEANS
Filed Sept. 11, 1951
4 Sheets-Sheet 3
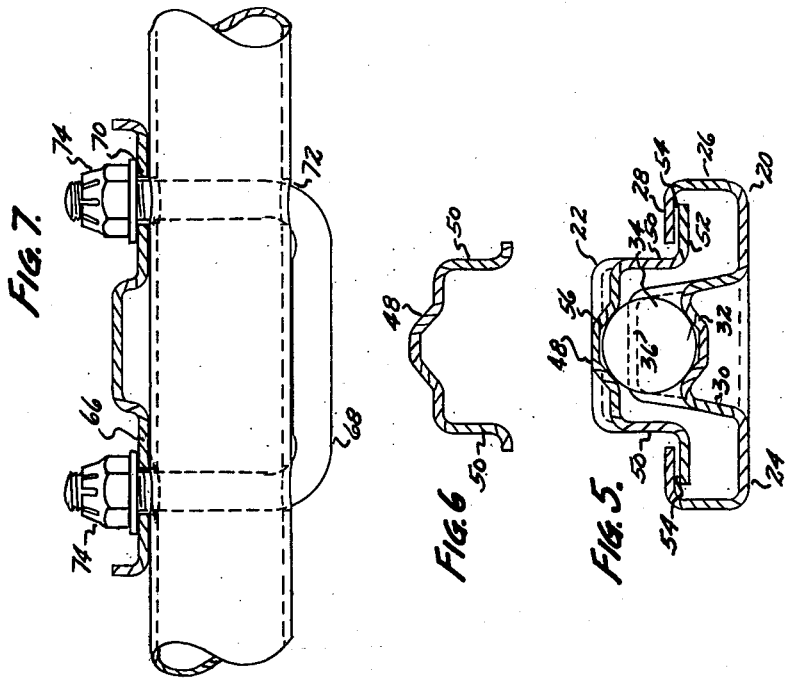
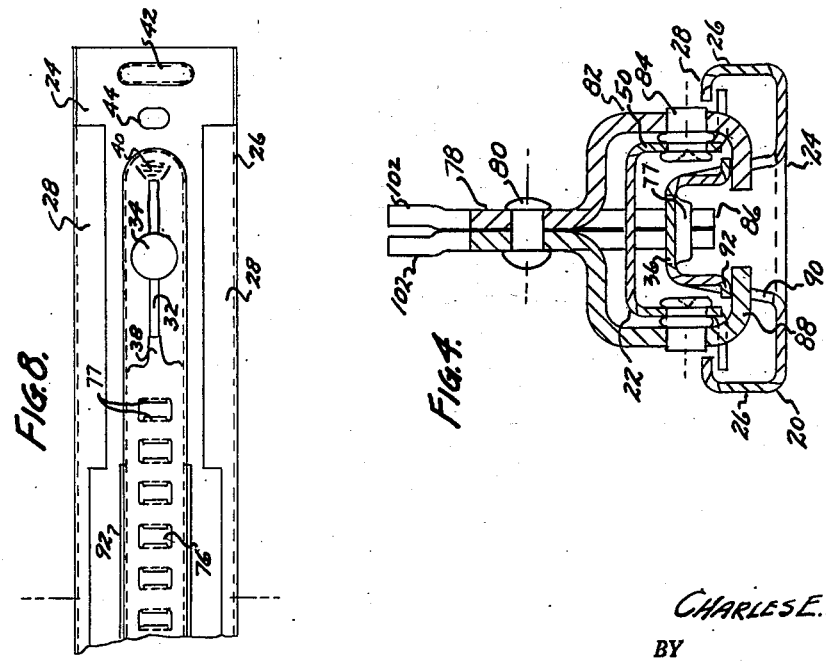
INVENTOR.
CHARLES E. McCORMICK
BY
Barnes, Kissell, Laughlin & Rusch Feb. 2, 1954  C. E. McCORMICK  2,667,912
ADJUSTABLE SEAT SUPPORTING MEANS
Filed Sept. 11, 1951  4 Sheets-Sheet 4
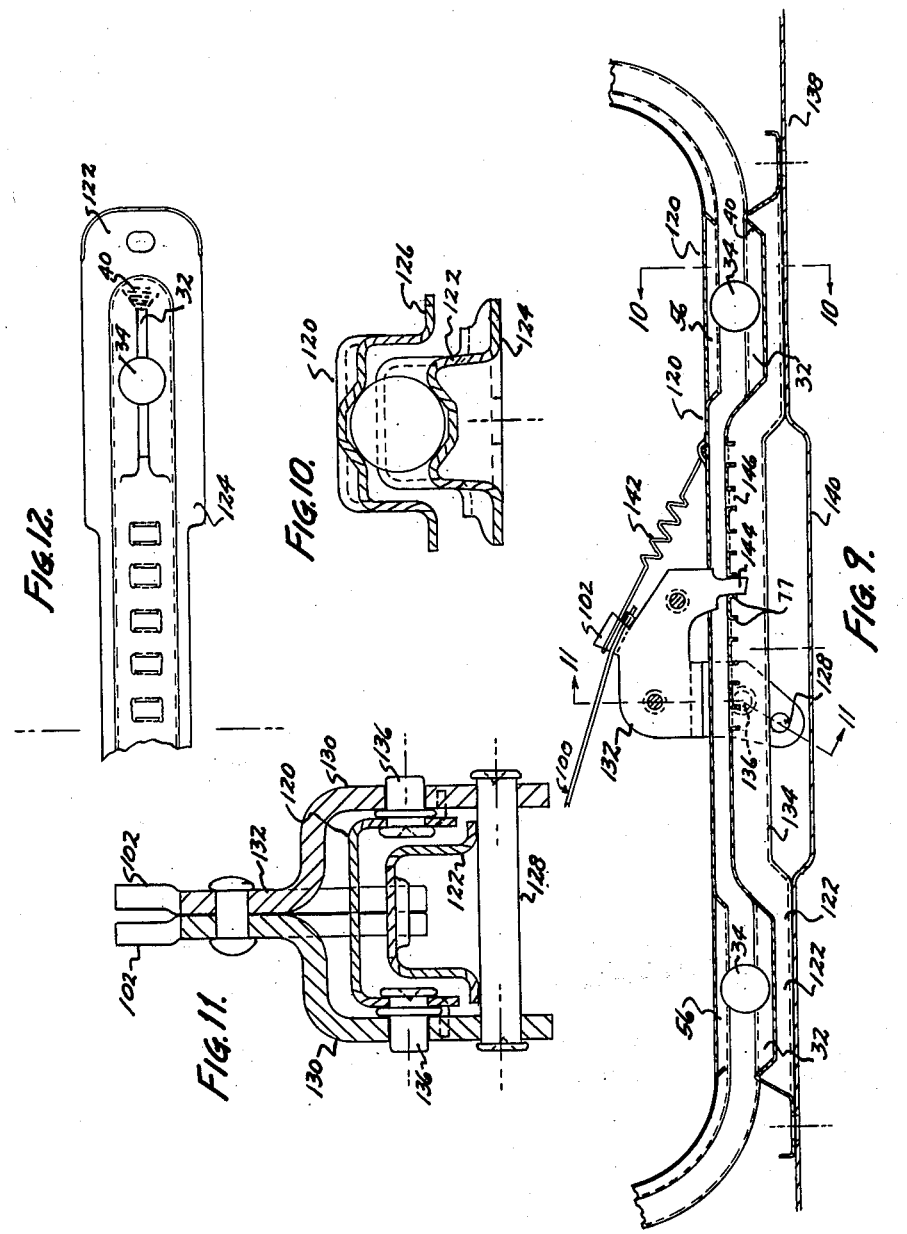
INVENTOR.
CHARLES E. McCORMICK
BY
Barnes, Kisselle, Laughlin + Raisch Patented Feb. 2, 1954

2,667,912

UNITED STATES PATENT OFFICE 2,667,912

ADJUSTABLE SEAT SUPPORTING MEANS

Charles E. McCormick, Dearborn, Mich.

Application September 11, 1951, Serial No. 246,011

15 Claims. (Cl. 155—14)

This invention relates to vehicle seats and more particularly to supporting means for adjustable vehicle seats.

It is an object of this invention to provide a seat track structure and suporting means for a vehicle seat which can be manufactured economically, which operates very smoothly and freely, and which can be effectively clamped in a rigid locked position to provide a very stable seat structure.

A further object of the invention resides in the provision of a simple and very effective latch operating mechanism for simultaneously operating a latch assembly on each of two widely spaced track assemblies.

Still another object of the invention resides in the simplified seat track or seat side construction wherein the conventional interlocking flanges on the individual tracks in each track assembly are replaced with a simplified interlocking member which also serves to clamp the tracks together in any position of adjustment.

A further object of the invention resides in the provision of an adjustable seat slide which, when locked, maintains the vehicle seat in a firmly fixed position without any rattle or looseness; and when the slide or track is unlocked, the seat may be moved very freely, the ease of movement being to a degree not usually present in such mechanisms.

The invention also has for an object the provision of a supporting structure for a vehicle seat which is much more rigid and stable than conventional constructions. Adjustable automobile seats are usually mounted at a considerable distance above the floor of the vehicle with the adjustable seat slides located at an intermediate line between the floor and the seat frame. This conventional construction has at times resulted in undesirable side movement of the seat due to the bending of the usually thin and unstable sheet metal floor of the vehicle. I have found that this difficulty can be substantially eliminated by mounting the lower track member of the seat supporting slide directly on the thin sheet metal floor and by extending the ends of the upper track member upwardly and rigidly connecting these upper ends with the seat frame. Thus, in my construction, the relatively rigid seat frame maintains correct parallel relation of the sliding upper track members when the seat is being moved; and since the connection between the upper and lower track members lies practically within the plane of the sheet metal floor of the vehicle, the sidewise stresses on the seat do not produce an appreciable bending movement on the sheet metal floor.

In the drawings:

Fig. 1 is a plan view of the seat supporting structure of this invention.

Fig. 2 is a diagrammatic view of the operating mechanism for the locking pawls on the track members.

Fig. 3 is a sectional view taken generally along the lines 3—3 in Fig. 1.

Fig. 4 is a sectional view taken along the lines 4—4 in Fig. 3.

Fig. 5 is a sectional view taken along the lines 5—5 in Fig. 3.

Fig. 6 is a sectional view taken along the lines 6—6 in Fig. 3.

Fig. 7 is a view showing the cross sectional shape of the upper track member at the upper end thereof and its connection with the tubular seat frame.

Fig. 8 is a fragmentary plan view of the lower track member.

Fig. 9 is a sectional view similar to Fig. 3 and showing a modified track construction.

Fig. 10 is a sectional view taken along the lines 10—10 in Fig. 9.

Fig. 11 is a sectional view taken along the lines 11—11 in Fig. 9.

Fig. 12 is a fragmentary plan view of the lower track section illustrated in Fig. 9.

Referring to the drawings and particularly to Figs. 1 and 3, there is illustrated a vehicle seat generally referenced 10 which includes a seat frame 12 having a transverse run 14 extending across the front of the seat, side runs 15 at each side of the seat, and a rear run 16 extending across the back side of the seat. Seat frame 12 is preferably fashioned from round tubing stock. The runs 14 and 15 are preferably in the form of an integral U-shaped member, and the member 16 is welded to the free ends of the runs 15 to provide a very rigid frame for the seat 10.

Seat 10 is adjustably supported on the floor pan 17 of the vehicle and in spaced relation thereto by means of the seat track and supporting structure generally referenced 18. The track and supporting structure 18 includes a lower track member 20 and an upper track member 22. Lower track member 20 is generally channel shaped in cross section, as is illustrated in Figs. 4 and 5, having a flat base portion 24 with a longitudinal upwardly extending flange 26 at each edge thereof which is turned inwardly as at 28. Adjacent each end of the base portion 24, the lower track member 20 is fashioned with an upwardly embossed portion 30 provided with a saddle or centrally grooved portion 32 which forms a raceway for a ball member 34. Between the embossed portions 30, lower track member 20 is fashioned with a further upwardly embossed portion 36. The inclined end portions 38 of portion 36 form stops for each of the balls 34 at one end of raceway 32. A raised portion 40 at the outer ends of raceway 32 forms stops for preventing rolling movement of ball 34 beyond the ends of raceways 32 opposite the stops 38. At each end the base portion 24 is provided with a stiffening rib 42 and an aperture 44 spaced inwardly of stiffening rib 42 for securing the track to the floor pan 17 of the vehicle as by bolts 46.

The upper track member 22 is also generally channel shaped in section, having a base portion 48 formed with a raceway 56 and provided with spaced depending flanges 50 which are turned outwardly along their lower edges as at 52 so that the outwardly turned flanges 52 are disposed beneath the inwardly turned flanges 28 of track member 20 when the track members are assembled with the balls 34 therebetween. The overlapping relationship of flanges 28 and 52 permits a limited vertical movement of track member 22 relative to track member 20, the extent of vertical movement being determined by the clearance indicated at 54. In other words, there is a relatively loose fit between track members 20 and 22 so that the track member 22 is permitted to move freely without undue friction with track member 20.

With the two track members arranged in the position illustrated in Fig. 1, raceways 56 are juxtaposed with raceways 32. At the inner and outer ends of each raceway 56 the base portion 48 has an inwardly struck tab 60, outer tab 60 cooperating with the ball 34, and the adjacent stop 38 limits the movement of the track members 20 and 22 in one direction, and a similar arrangement at the opposite end of the assembly limits the movement of the track members in the opposite direction. The inner tabs 60 are not intended to limit the movement of the track members 20 and 22 but merely to prevent the balls 34 from escaping from their respective raceways. The overlapping flanges 28 and 52 prevent vertical separation of the track members when the balls 34 engage the stops at the ends of raceways 32 and 56.

At each end upper track member 22 is curved upwardly as at 62 to provide a generally upright leg portion 64 at each end of the track to which the tubular seat frame 12 may be connected. The extreme upper end of each leg 64 is fashioned to provide a U-shaped socket 66 for the tubular frame member 12, the socket 66 at the front end of the track accommodating the run 14 and the socket 66 at the rear end of track 22 accommodating the rear run 16. The frame 12 is firmly mounted within the sockets 66 by U-bolts 68 which pass through registering openings 70 and 72 in seats 66 and frame 12, respectively. The members are clamped together by means of nuts 74 threaded on the ends of U bolts 68.

It will be observed that the legs 64 have the same general cross section as track 22 in the region of raceways 56. The tabs 60 define the ends of each of the raceways 56, the outer end tabs being struck after the track members are assembled with the balls 34 therebetween. Balls 34 are first slipped into their respective raceways of the juxtaposed track members, and the outer end tabs 60 are then struck inwardly.

In order to enable adjustment of upper track 22 to a plurality of fixed positions along track 20, the base portion of the central, upwardly embossed portion 36 of lower track 20 is formed with a plurality of longitudinally spaced openings 76 having abutments 77 on two sides thereof. Upper track member 22 has a latch member 78 pivoted thereon. Latch member 78 is formed from two half sections riveted together as at 80. Each half section of latch member 78 has an outwardly offset portion 82 which is pivotally supported by the side wall portion 50 of track member 22 as by the trunnion pins 84 to form a yoke. The trunnion pins 84, it will be observed, are mounted on an axis extending perpendicular to the longitudinal axis of the raceways 32 and 56. It will also be noted that the pivotal axis of the latch member 78 intersects the longitudinal axis of abutments 77 in the embossed portion 36 of track member 20. The free end of latch member 78 is formed with a detent 86 which, when the latch member is pivoted, is adapted to engage within one of the openings 76 and against abutments 77 to prevent relative longitudinal movement of track members 20 and 22. At their extreme lower ends, the outwardly offset portions 82 of latch member 78 which straddle track member 22 are bent inwardly as at 88.

The side walls of the central upward embossment 36 of track member 20 are provided with longitudinally extending openings or slots 90 through which the inwardly extending flange portions 88 of latch member 78 project. The upper edges of slots 90 are flanged as at 92 to provide a smooth and rigid bearing surface. Flange portions 88 are fashioned with cam surfaces 94 which, when the latch member 78 is pivoted to engage the detent 86 with one of the openings 76, are brought into engagement with the flanged edges 92 along the upper edge of slot 90. It will be observed that, when latch member 78 is pivoted downwardly to engage detent 86 with one of the openings 76, the cam surfaces 94 clamp against the flanged edges 92 of openings 90 and thereby draw the upper track member 22 downwardly against balls 34. In other words, latch member 78 serves not only to lock the track members against relative longitudinal movement but also to rigidly clamp the track members together and thereby prevent the upward displacement of upper track 22 such as might occur when the vehicle is stopped suddenly or when the occupant of the seat 10 leans back against the seat back 96. Thus, the clearance 54 provides a rather loose connection between the two track members so that the upper track member is permitted to roll freely on the lower track member, and at the same time the latch member 78 firmly clamps the two track members together when the seat is locked in a predetermined position of longitudinal adjustment.

Latch member 78 is normally biased by a tension spring 98 in a direction tending to engage detent 86 with one of the openings 76. It will be appreciated that the track assemblies 18 at each side of the seat are provided with a latch member 78, and therefore means must be provided for simultaneously operating these latch members to permit convenient longitudinal adjustment of the seat. The means employed are preferably in the form of a flexible cable 100 arranged in the form of a loop having one end connected with a pair of lugs 102 on one of the latch members 78 and its other end connected to a similar pair of lugs on the latch member 78 at the other side of the seat. The front leg portion 62 of each upper track member 20 has supported thereon, as by a bracket 104, a pulley 106 around which cable 100 extends. Cable 100 is of a length such that there is a slight slack in it when the cams 94 are in contact with flange 92, the detents 86 are in locked position, and the tracks 20 and 22 are tight together in the position illustrated in Fig. 3.

On the front run 14 of frame 12 there is pivotally supported a handle member 108 which is fashioned with a portion 110 adapted to be gripped manually and with shaft portion 112 extending through and supported by a bracket 165 on the front run 14 and having fixed at the free end thereof a lever 114 provided with spaced apart pulleys 116 between which the cable 100 extends. It will be observed that, when handle 108 is pivoted, the pulley members 116 are revolved about shaft 112 as an axis and thereby shorten the effective length of cable 100 which in turn serves to pivot latch members 78 against the tension of springs 98 to disengage detents 86 from the cooperating openings 76 and at the same time to pivot the cam faces 94 downwardly out of engagement with the flanged edges 92 of the slots 90.

The pulley members 116 and 106 are employed so that there will be a minimum of friction associated with the operation of releasing the latch members. These members, however, need not be in the form of pulleys. The pulleys 116, for instance, merely serve as spaced apart projections on lever 114; and these projections may be in the form of fixed arcuate surfaces, for instance, rather than pulleys.

It will be noted that the release mechanism described herein is designed to apply equal forces simultaneously on each of the two latch members 78 so that both of these latch members are simultaneously urged out of engagement with the openings 76 with equal force. If one latch moves more freely than the other, then the one latch will move first to the limit of its movement, that is, to a position wherein the front edge 117 of latch 78 engages against the base portion 48 of track member 22. After the more freely movable latch member moves to the limit of its movement, then if sufficient force is applied to handle 108, the tighter latch at the other side of the seat will move out of engagement with its respective opening 76. If one of the latches moves prior to the other, then cable 100 will automatically slip past pulleys 116 when the handle 108 is pivoted. Therefore continued movement of handle 108 will result in full disengagement of both latches. Thus, the combination of the cable 100 and handle 108 insures equalization of the pull exerted on both of the latches and also insures the full disengagement of both latches. It will be appreciated, of course, that although the handle assembly 108 is illustrated as located on the front side of the seat in a more or less central position, this handle assembly can be located at almost any point around the front or side edges of the seat.

The construction illustrated in Figs. 9 through 12 is in general very similar to the embodiment already described. It will be noted, however, that the track members 120 and 122 are shaped slightly different from the track members 20 and 22. I have found that the provision of the overlapping flanges 28 and 52 is not absolutely essential, and therefore in the construction shown in Figs. 9 through 12, these overlapping flanges have been eliminated, thus conserving material and eliminating forming and other operations. Thus, lower track member 122 terminates along each side with base flanges 124 which are spaced below and do not overlie the base flanges 126 of upper track member 120. Flanges 124 and 126 are provided primarily for the purpose of strengthening these track members. From the standpoint of safety, it is important, however, in a seat track construction to provide means for preventing complete separation of the track members in case of sudden impact or collision.

In the embodiment illustrated in Figs. 1 through 8 the safety means comprise the overlapping flanges 28 and 52. In the embodiment illustrated in Figs. 9 through 12 the safety means for preventing separation of the track members comprise a pin 128 which extends across the lower ends of the laterally offset side wall portions 130 of latch member 132. The base of track member 122 has an upwardly offset central portion 134 for accommodating pin 128. It will be observed, as in the previous embodiment described, that latch member 132 is pivotally supported on the upper track member 120 as by trunnion pins 136. Pin 128 extends below and entirely across the base of track member 122. In this form of construction the floor panel 138 of the vehicle is provided with a recessed portion 140 which cooperates with the upwardly offset portion 134 of track 122 to provide sufficient clearance to accommodate pin 128 and the lower ends of latch member 132. When latch member 132 is pivoted downwardly under the influence of spring 142 to engage detent 144 in one of the spaced apertures 146 on track member 122, pin 128 engages the under side of the offset portion 134 of track member 122 to firmly clamp the track members together. In other respects the construction and operation of the track assembly illustrated in Figs. 9 through 12 is generally the same as that shown in Figs. 1 through 8.

It will be appreciated that, although the means illustrated on the lower track member for locking the tracks in a plurality of longitudinally adjusted positions are in the form of openings 76, other means may be employed for interengaging with the detent on the latch member (detent 86 in the case of latch 78 and detent 144 in the case of latch 132). Thus, these means may be in the form of a series of depressions, sockets or notches in the raised portion 36 of the lower track member.

Thus, it will be seen that I have provided a relatively simple construction for a seat track which operates very smoothly and freely when unlocked for adjustment but which, at the same time, is arranged to be firmly locked in a position of longitudinal adjustment and tightly clamped against lateral movement, that is, the tracks are prevented from moving relative to each other in a direction transversely of the longitudinal axes of the two track members. The comparatively loose fit between the upper and lower track members insures free sliding movement of the upper track member on the lower track member when unlocked for adjustment. The operation of the seat is not substantially impaired by the accumulation of dust or dirt in the raceways of the two track members. At the same time, the clamping action of the locking pawl provides a very firm and rattle-free arrangement when the two track members are locked in a desired position of adjustment.

It will also be noted that the rigidity of the construction is enhanced by mounting the base of the lower track member directly on the floor panel of the vehicle and by curving the ends of the upper track member upwardly for direct connection with the frame of the vehicle seat.

I claim:

1. An adjustable seat support comprising a pair of track members having juxtaposed raceways, anti-friction rolling elements positioned in said raceways and between said track members, said track members being loosely connected together and being free to move relative to one another in a direction longitudinally of the raceways, and means for clamping said track members tightly together comprising a yoke pivotally supported on one of said track members and having a pair of legs straddling the other track member, a clamping member at the end of at least one of said legs, and a clamping surface on said other track member engageable by said clamping member when the yoke is pivoted to thereby clamp said tracks tightly together against said rolling elements.

2. The combination set forth in claim 1 including means biasing said yoke to a position normally urging said clamping member into engagement with said clamping surface.

3. An adjustable seat support comprising a pair of track members each having raceways adjacent each end thereof, said track members being arranged such that the raceways on one track member are juxtaposed to the raceways on the other track member, anti-friction rolling elements in said raceways and between said track members for permitting relative longitudinal movement of said track members, one of said track members having a portion intermediate the raceways thereon offset from the raceways in the direction of the other track member, said offset portion being provided with a plurality of longitudinally spaced sockets, a latch member pivoted on the other track member and having a detent selectively engageable with said sockets to lock said track members together in a plurality of longitudinally adjustable positions.

4. The combination set forth in claim 3 wherein the opposite ends of said offset portion form stops for limiting the extent of rolling movement of said anti-friction rolling elements.

5. The combination set forth in claim 3 wherein said latch member comprises a yoke pivoted on the one track member and having a pair of depending legs straddling the other track member and including means extending between the free ends of said legs and engageable with a portion of said other track member when said latch member is pivoted into engagement with said sockets to clamp said track members tightly together against said anti-friction rolling elements.

6. The combination set forth in claim 3 wherein the latch member is pivoted on an axis extending transversely of and intersecting the longitudinal axis of said longitudinally spaced sockets.

7. In a seat supporting arrangement for a vehicle of the type wherein the seat is supported at each side by adjustable supports, each support including a pair of relatively movable track members and a locking member movably mounted on one of the track members of each pair and engageable with the other track member of each pair to lock the seat in a plurality of different positions of longitudinal adjustment, the combination of the release mechanism for actuating the locking member on each of the supports to a position out of engagement with its associated track member comprising a flexible tension member extending between and connected with the latch members on said two supports, and means slidably engageable with said tension member to shorten the effective length thereof and thereby exert simultaneous and equal forces on said two latch members to urge said latch members out of engagement with their associated track members.

8. The combination set forth in claim 7 wherein said last mentioned means includes a rotatable member and means on said rotatable member engageable with the cable at two spaced points on opposite sides of the pivotal axis of the rotatable member.

9. The combination set forth in claim 8 wherein said last mentioned means comprises a pivotally supported shaft having adjacent one end thereof a lever fixed thereto, a pair of pulleys on said lever spaced on opposite sides of the pivotal axis of said shaft and engaging said tension member.

10. In a vehicle, the combination of a pair of adjustable seat supports spaced apart transversely of the vehicle and mounted on the floor of the vehicle, a seat supported adjacent its opposite ends on said supports, each of said supports comprising two track members movably interengaged for relative longitudinal movement, one of said track members being secured to the floor of the vehicle and the other track member being connected with the frame of the vehicle seat, one of said track members having a latch member movably mounted thereon and engageable with the other track member to lock the seat in a plurality of different positions of longitudinal adjustment, means normally biasing said latch member into engagement with said other track member, and means for retracting the latch member out of engagement with said other track member comprising a relatively non-extensible flexible cable extending between and connected at its opposite ends with said latches, a shaft pivoted on an axis fixed relative to the track member on which the latch member is pivoted, a pair of spaced apart members at one end of the shaft engaging opposite sides of the cable and arranged, when the shaft is rotated, to draw the portions of said cable extending between said shaft and said latches in the direction of said shaft to thereby shorten the effective length of said cable and simultaneously urge with equal forces the latches out of engagement with said other track member.

11. The combination set forth in claim 10 wherein said pair of members on said shaft comprises a pair of pulleys rotatably supported by said shaft on opposite sides of the axis of said shaft.

12. In a vehicle, the combination of a pair of adjustable seat support assemblies spaced apart transversely of the vehicle and mounted on the floor thereof, a seat supported adjacent its opposite ends on said support assemblies, each of said assemblies comprising two track members slidably arranged for relative movement longitudinally of the vehicle, one of said tracks being secured to the floor of the vehicle and the other being connected with the frame of the vehicle seat, one of said tracks having a latch member movably mounted thereon, the other track having a plurality of longitudinally spaced sockets thereon with which the latch member is selectively engageable to lock the seat in a plurality of different positions of longitudinal adjustment, means normally biasing said latch member into engagement with said sockets, and means for retracting the latch member out of engagement with said abutments comprising a relatively non-extensible cable extending between and connected at its opposite ends with said latches, a shaft pivoted on an axis fixed relative to the track member on which the latch is pivoted, said shaft having a pair of spaced apart projections engaging the opposite sides of the cable and arranged, when the shaft is rotated, to urge the portions of said cable extending between said shaft and said latches in the direction of said shaft to thereby shorten the effective length of said cable and simultaneously urge the latches out of engagement with said abutments.

13. In a vehicle, the combination of a pair of adjustable support assemblies spaced apart transversely of the vehicle and mounted on the floor of the vehicle, a seat supported adjacent its opposite ends of said support assemblies, each of said assemblies comprising two track members slidably arranged for relative longitudinal movement parallel to the longitudinal axis of the vehicle, one of said tracks being secured to the floor of the vehicle and the other being connected with the frame of the vehicle seat, one of said tracks having a latch member movably mounted thereon, the other track member having a plurality of longitudinally spaced sockets thereon with which the latch member is selectively engageable to lock the seat in a plurality of different positions of longitudinal adjustment, means normally biasing said latch member into engagement with said sockets, and means for retracting the latch member out of engagement with said sockets comprising a relatively non-extensible flexible cable extending between and connected at its opposite ends with said latches, and a pivotally supported actuating member arranged when pivoted to shorten the effective length of said cable and thereby urge the portions of said cable extending between said actuating member and said latches in the direction of said actuating member, said actuating member having a slippable connection with said cable whereby the cable is adapted to slip past said actuating member to simultaneously apply equal force on said latches.

14. The combination set forth in claim 13 wherein the actuating member is pivoted on an axis fixed relative to the track on which the latch is supported.

15. An adjustable seat support comprising a pair of track members having juxtaposed raceways, anti-friction rolling elements positioned in said raceways and between said track members, said track members being loosely connected together and being free to move relative to one another in a direction longitudinally of the raceways, and means for clamping said track members tightly together comprising a yoke pivotally supported on one of said track members and having a pair of legs straddling the other track member, a clamping member extending across the ends of said legs so that said other track member is disposed between said clamping member and the bight portion of said yoke, and a clamping surface on said other track member engageable by said clamping member when the yoke is pivoted to thereby clamp said tracks tightly together against said rolling elements.

CHARLES E. McCORMICK.

References Cited in the file of this patent

UNITED STATES PATENTS

| Number | Name | Date |
|---|---|---|
| 1,735,518 | Van Valkenburg et al. | Nov. 12, 1929 |
| 1,887,077 | Westrope | Nov. 8, 1932 |
| 1,964,405 | Nenne | June 26, 1934 |
| 1,987,431 | Browne | Jan. 8, 1935 |
| 2,237,843 | Rhodes | Apr. 8, 1941 |
| 2,277,927 | McGregor | Mar. 31, 1942 |
| 2,335,254 | Atwood et al. | Nov. 30, 1943 |

FOREIGN PATENTS

| Number | Country | Date |
|---|---|---|
| 1,870 | Great Britain | 1892 |
| 316,437 | Great Britain | Aug. 1, 1929 |